Aug. 27, 1968    M. H. FOEG    3,398,942

GRATE COOLER CONTROL METHOD AND APPARATUS

Filed July 6, 1966

United States Patent Office 3,398,942
Patented Aug. 27, 1968

3,398,942
GRATE COOLER CONTROL METHOD
AND APPARATUS
Mogens H. Foeg, Old Greenwich, Conn., assignor to F. L. Smidth & Co., New York, N.Y., a corporation of Delaware
Filed July 6, 1966, Ser. No. 563,174
10 Claims. (Cl. 263—32)

ABSTRACT OF THE DISCLOSURE

Method and apparatus for controlling the cooling of a moving bed of hot granular material such as cement clinker where the permeability of the bed is subject to change both crosswise and lengthwise and cooling air is forced under variable pressure upwardly through the bed according to changes in the permeability, the control being accomplished by measuring the temperature variations caused by the different thicknesses of the bed measured across the width of the bed and along the path of travel of the material.

---

Figure 1:
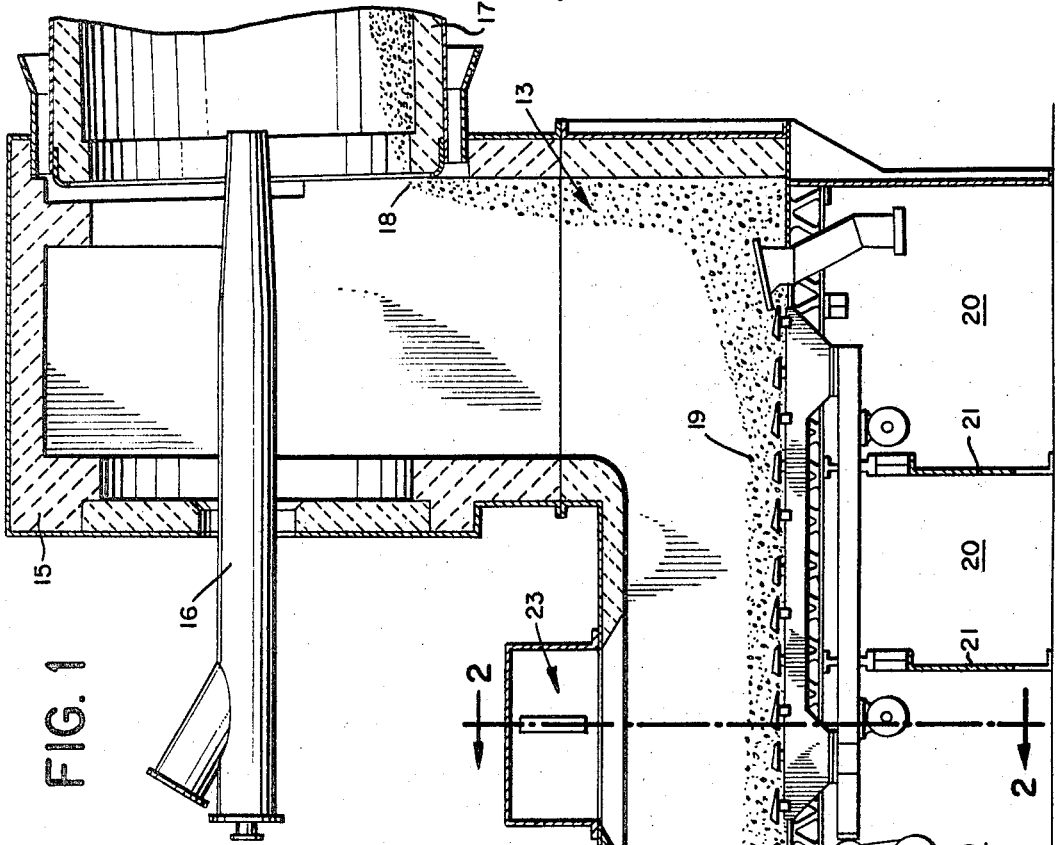

This invention relates to a grate cooler and to its operation in cooling a bed of granular material such as cement clinker, and more particularly it relates to a method and apparatus for controlling the amount of cooling air fed through the bed of granular material in relation to temperature variations measured across the width of the bed of material and along the path of travel of the material.

Horizontal and inclined grate coolers are usually designed for cooling clinker from rotary kilns in cement plants. The cooler is normally positioned below the kiln with the inlet opening of the cooler casing located under the discharge opening of the kiln. The hot clinker from the kiln drops to the grate cooler where it forms a layer over the width of the grate. The clinker bed is then conveyed slowly along the grate from the inlet end to the discharge end at a variable rate of speed. Cooling air is forced through the grate and through the clinker bed to cool the clinker. After passing through the clinker bed, part of the heated air enters the kiln and is used as secondary combustion air for the burning processes.

In theory, the operation of a grate cooler is quite simple, however, several variables add to the difficulty of obtaining uniformity in the operation of the cooler. First, the unpredictable rate of discharge from the kiln varies the material input to the cooler in short cycles and this coupled with the variations in speed of the grate makes the thickness of the bed a variable. Secondly, it is necessary to apply the cooling air at a minimum pressure before it will penetrate a given bed thickness; the permeability of the bed, which varies with the granulation of the material, and thickness of the bed which varies with the kiln discharge, dictate the air pressure necessary. Furthermore, the velocity of the air through the bed is quite critical, at too high a velocity, the bed will not assume a stable state of suspension and a greater number of the smaller particles will leave the bed with the air stream and will be carried into the kiln or out into the ventilating system. If the air flow is reduced too much, the air pressure may drop below the critical minimum and the air will not penetrate the bed. If there is no penetration of air through the bed, heat from the material will soak into the grates and cause damage to the cooler. It is therefore the common practice, particularly in the plenum compartments at the inlet end of the grate, to blow an excess of air through the bed of material. This is done because hardly any information is available on temperature or air penetration in this area and since a deficiency of air will cause serious damage to the cooler, an excess of air is normally blown through the bed of material and the loss of smaller particles in the air stream is tolerated.

Attempts have heretofore been made to take temperature measurements in an effort to obtain some information on the cooling which is taking place in the grate cooler. Most of these attempts have been to take measurement of the secondary air temperature, the theory being that a uniform secondary air temperature is indicative of the cooling which is occurring and is essential for stable kiln operation. This type of control has never been too successful, primarily because it is physically impossible to obtain a true average sample of secondary air to measure and the results do not accurately indicate the precise conditions in the bed. Attempts have also been made to measure the material temperature at various locations with thermocouples in an attempt to determine the actual degree of cooling. This was also unsuccessful because the thermocouples could not stand up under the normal operating conditions.

It is the principle of this invention to measure the temperature of a material across the width of the bed and continuously along the path of travel of the bed so as to determine any temperature variations across the bed width and any temperature varitions in the axially advancing bed of granular material. By knowing the variations in the temperature across the width, the air flow can be increased to effect cooling of the maximum temperature variation detected, or reduced where the temperature detected falls below a certain level, thereby insuring minimum loss of fine particles without danger of localized heating which could damage the cooler. Monitoring the temperature varitions along the axial advance of the bed of material records the changes in feed to the cooler from the kiln and adjustments can be made to the speed of the grate in order to maintain a substantially uniform temperature profile.

Uneven temperature across the bed indicates uneven distribution of the material across the cooler which is possibly caused by crustations at the kiln discharge and the cooler inlet. It is proposed that the design of the standard cooler itself may be changed to permit application of a higher rate of air where most needed across the width of the bed in order to obtain optimum even material temperature. This can be done by adding several undergrate plenum compartments across the width of the bed. With the standard coolers, the air pressure cannot be varied across the width of the bed, but by raising the pressure high enough to cool the material where the highest temperature is detected will insure most efficient cooling with minimum loss of particles in the air stream. By monitoring the temperature of the material along the path of advance of the bed, it is possible to control the temperature of the bed by regulating the grate speed in response to temperature changes measured downstream. It can be seen therefore that the tendency to apply excess air along the grate cooler can be minimized and the loss of small particles to the ventilators or ventilation to the kiln can be substantially decreased.

Broadly stated, the invention is in a grate cooler for cooling granular material such as cement clinker of the type having a moving grate on which a bed of granular material is conveyed from a source of hot granular material to an outlet for the cooled granular material and a plenum chamber underlying the grate. The improvement is in means for measuring temperature variations across the width of material on the grate. It can also include measuring the continuity of material temperature in the path of travel of the bed of material. Air control means are provided for regulating air flow into the material from the plenum chamber. It is specifically proposed that the means for measurinng the material temperatures can comprise a scanning radiation pyrometer mounted above the grate.

The invention also provides a method of cooling a moving bed of granular material in a grate cooler wherein air under pressure is forced through the bed and the heated air is recovered for secondary uses. The improvement is in a method of controlling air flow and comprises measuring temperature across the width of the material and detecting temperature variations thereacross and measuring the continuuity of material temperature along the path of travel of the bed and varying the rate of air pressure in relation to the temperature to obtain minimum air flow for effective cooling of the granular material.

Figure 2:
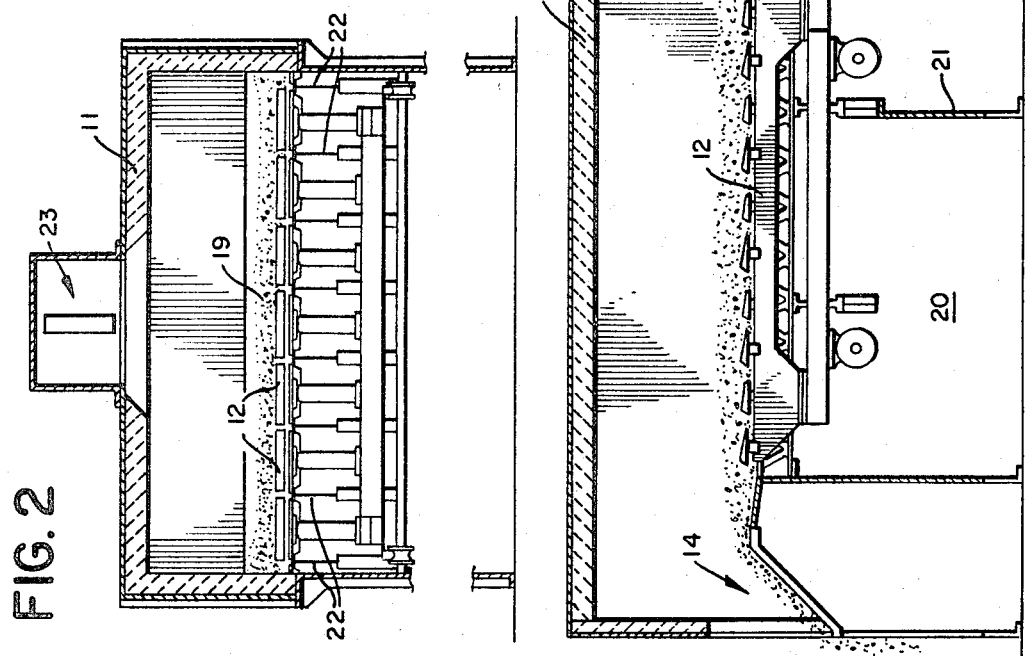

A preferred embodiment of the invention is described hereinbelow with reference to the drawings wherein:

FIG. 1 is a side elevation partly in section of a grate cooler connected to a rotary cement kiln, and FIG. 2 is a section taken along lines 2-2 of FIG. 1.

A horizontal grate cooler 10 is shown in FIG. 1 as having an elongated insulated housing 11 defining a hot air compartment lined with refractory and in which is mounted a reciprocating movable grate 12 which extends longitudinally in the housing for transferring granular material from an inlet end 13 to an outlet end 14. The horizontal grate is supported on a heavy frame and part of the grate usually consists of a serious of wedge-shaped conveyor pads called movable grates, which have the butt of the wedge facing in the direction in which clinker is conveyed so that on the forward movement the conveyor pads will push the clinker bed ahead and on the reverse movement the wedge end of the pads will slide under the clinker. Extending above the inlet end 13 of the grate cooler is a kiln hood 15 into which extends a kiln burner pipe 16 through which fuel is injected into the outlet end of a rotary kiln 17. The outlet end of the rotary kiln 17 is shown opening into the kiln hood and granular material such as cement clinker 18 as shown being discharged onto moving grate 12 where it forms a bed 19 of granular material. Mounted beneath the reciprocal grate 12, as is common in grate coolers, are a series of plenum chambers 20 from which air under pressure is blown through the grate and the bed of granular material to effect cooling the granular material. The air after passing through the granular material is conveyed to the kiln hood and into the kiln as secondary heated air for combustion.

Vertical transversely extending portions 21 divide the cold air plenum chamber under the grate onto a number of longitudinal compartments and these compartments in turn are connected to cooling air fans provided with the necessary control dampers to permit proper distribution of cooling air through the various parts of the grate. As shown in FIG. 2, it is intended that longitudinal partitions 22 can be mounted between the transverse partitions 21 to divide the compartments into separate transverse compartments. The number of fans required depends on the size of the coolers but it is intended that each compartment will have a selective fan control so that the conditions can be varied in each compartment. The rate of speed at which the clinker bed moves on the grate and the quantity of air passing through the grate may be regulated individually, independent of the kiln operation. Generally, the velocity of the air passed through the grate for cement clinker will be from about 100 to 400 feet per minute.

Mounted in the top of the housing 11 above the movable grate 12 is a scanning radiation pyrometer 23 of suitable design to detect the temperature of the bed of material. The pyrometer 23 is positioned to scan the width of the bed of material and to continuously monitor the temperature of the bed of material as it axially advances past the pyrometer. In a cement clinker operation, an optical pyrometer having a temperature sensitivity from 500 to 2000° F. would be satisfactory.

The radiation pyrometer detects the temperature in both the lateral and transverse directions of the moving bed and the signals from the scanner are connected to a control for automatically regulating the fans in each compartment in relation to the temperature measurements. The grate drive is also connected to a control recording the temperature continuity along the path of travel of the bed for maintaining uniformity of bed thickness in relation to these temperature measurements. It is also obvious that these signal outputs could serve as computer inputs; thus a computer connected to the air flow controls would serve as a fully automatic control over the grate cooler.

In operation, the clinker is discharged from the rotary kiln and lands on the inlet end of the grate 12 and begins its travel over the cooling air to the outlet end of the grate. The temperature of the clinker as it is fed into the cooler is about 2300° F. By controlling the speed of the grate in relation to the clinker discharge from the rotary kiln, control can be maintained over the depth of the bed. This control is particularly important because an excessive accumulation of clinker in the inlet zone might cause the clinker to go into suspension under the action of the air and interfere with the operations of the cooler. As the clinker is conveyed from the inlet to the outlet end of the cooler, cool air is blown through the clinker bed to cool the clinker and at least part of the heated air is recovered as secondary air for combustion in the kiln. As the bed is fed past the pyrometer 23 which scans a plane which is the width of the bed, a reading is taken of the temperature across the width of the bed to determine whether there are any temperature variations across the width of the bed. By detecting any temperature variations the air pressure is increased or decreased appropriately to obtain complete cooling of the clinker but not excessive entrainment of fine particles in the air.

It is particularly desirable to provide separate transverse compartments which have separate self-contained fans so that variations in the temperature can be corrected in given areas without disturbing the entire bed. Automatic control can easily be achieved by simply connecting the signals received from the pyrometer to the fan controls.

As the pyrometer scans the width of the bed, readings can also be taken of the temperature of the bed being axially fed past the pyrometer and by continuously monitoring these temperature readings, they can be used as a basis for determining variations in bed depth. Of course, the signals representing this continuous monitoring can be used for automatically controlling grate speed in relation to these readings.

I claim:

1. In the method of cooling a moving bed of granular material in a grate cooler wherein air under pressure is forced through the bed, the improvement in a method of controlling air flow comprising measuring temperature across the width of the material and detecting temperature variations thereacross and varying the rate of air flow in relation to the temperature to obtain minimum air flow for effective cooling of the granular material.

2. A method according to claim 1 comprising measuring the continuity of material temperature along the path of travel of the bed and varying the speed of the grate as well as the rate of air flow in relation to the temperature variations.

3. A method according to claim 1 wherein said air flow is selectively varied along areas of the bed in proportion to temperature readings taken along the bed.

4. In a grate cooler for cooling granular material such as cement clinker having a moving grate on which a bed of granular material is conveyed from a source of hot granular material to an outlet for the cooled material and at least one plenum chamber underlying the grate for supplying air under pressure upwardly through the grate and bed of material being conveyed on the grate, the improvement in combination therewith comprising means positioned above the grate for continuously measuring the temperature of the bed of material across its width in its path of travel to determine variations in temperature across the bed width and temperature variations in the axially advancing bed of granular material and air control means for increasing or decreasing air flow through the bed of material responsive to an increase or decrease in temperature of the bed.

5. In a grate cooler according to claim 4, said means for measuring the material temperature comprising a scanning radiation pyrometer mounted above the grate for scanning the width of the bed of granular material and continuously monitoring the temperature of the bed of material as it axially advances past the pyrometer.

6. In a grate cooler according to claim 4 wherein said grate includes a variable speed drive means for increasing or decreasing the drive in relation to an increase or decrease in detected temperature.

7. In a grate cooler according to claim 4 said means for measuring temperature across the width includes means for recording the continuity of material temperature in the path of travel of the bed of material.

8. In a grate cooler according to claim 5 said scanning radiation pyrometer includes means for recording the continuity of material temperature in the path of travel of the bed of material.

9. In a grate cooler according to claim 4 said plenum chamber being divided into a plurality of longitudinal and transverse compartments, each with individually controlled means for forcing air through the grate overlying the compartment whereby selective control of cooling air can be effected in relation to variations in temperature readings.

10. A grate cooler according to claim 9 which is connected to the outlet of a cement rotary kiln in which heated air from the material enters the kiln as secondary air for combustion.

References Cited

UNITED STATES PATENTS

| | | | |
|---|---|---|---|
| 2,094,786 | 10/1937 | Flint | 34—164 |
| 2,312,034 | 2/1943 | Gaffney | 34—164 |
| 3,257,188 | 6/1966 | Morgan et al. | 236—15 |
| 3,259,995 | 7/1966 | Powischill | 236—15 |

JOHN J. CAMBY, *Acting Primary Examiner.*